(12) United States Patent
Park et al.

(10) Patent No.: US 9,841,206 B2
(45) Date of Patent: Dec. 12, 2017

(54) INSTALLATION GUIDE SYSTEM FOR AIR CONDITIONER AND METHOD OF USING THE SAME

(71) Applicant: LG ELECTRONICS INC., Seoul (KR)

(72) Inventors: Jungyul Park, Changwon-si (KR); Sangeun Cho, Changwon-si (KR); Shinae Kang, Changwon-si (KR); Junmo Kim, Changwon-si (KR); Mingyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 528 days.

(21) Appl. No.: 14/072,045

(22) Filed: Nov. 5, 2013

(65) Prior Publication Data

US 2014/0148956 A1 May 29, 2014

(30) Foreign Application Priority Data

Nov. 27, 2012 (KR) .......................... 10-2012-0135501

(51) Int. Cl.
*F24F 11/00* (2006.01)
*G06F 17/50* (2006.01)

(52) U.S. Cl.
CPC ...... *F24F 11/0086* (2013.01); *G06F 17/5004* (2013.01); *G06F 17/509* (2013.01); *G06F 2217/34* (2013.01)

(58) Field of Classification Search
CPC ....................................................... F24F 11/86

(Continued)

(56) References Cited

U.S. PATENT DOCUMENTS 4,551,810 A 11/1985 Levine
5,557,537 A 9/1996 Normann et al.
(Continued)

FOREIGN PATENT DOCUMENTS

CN 101067315 11/2007
CN 101923587 12/2010
(Continued)

OTHER PUBLICATIONS

U.S. Office Action dated Apr. 19, 2016 issued in co-pending U.S. Appl. No. 14/072,110.

(Continued)

*Primary Examiner* — Christopher E Everett
(74) *Attorney, Agent, or Firm* — Ked & Associates, LLP

(57) ABSTRACT

Provided are an installation guide system for an air conditioner and a method of using the same, including a display that displays a user interface for designing an installation for an air conditioner, a memory that stores at least one image for a building, and a controller to control a display of the stored images on the user interface. The user interface may include a first region that displays information with respect to a plurality of recommended configurations of the air conditioner including configuration of plurality of tubes that connect an outdoor unit to at least one indoor unit, and a second region that displays one of the stored images for a building and including a display of the outdoor unit, the indoor unit and the plurality of tubes The displayed image may be configured based on a selected recommended configuration of the air conditioner selected in the first region.

4 Claims, 17 Drawing Sheets

(58) Field of Classification Search
USPC .......................................................... 700/276
See application file for complete search history.

(56) References Cited

U.S. PATENT DOCUMENTS

| | | | |
|---|---|---|---|
| 7,702,421 B2* | 4/2010 | Sullivan | F24F 11/0009 236/51 |
| 8,249,841 B1 | 8/2012 | Ferrer | |
| 8,260,581 B2* | 9/2012 | Hoguet | G06F 17/5081 703/1 |
| 2005/0109047 A1* | 5/2005 | Park | F24F 11/0086 62/125 |
| 2005/0165591 A1 | 7/2005 | Bahel et al. | 703/7 |
| 2006/0247902 A1 | 11/2006 | Rourke | 703/1 |
| 2007/0186149 A1 | 8/2007 | Ghantous | |
| 2007/0219764 A1* | 9/2007 | Backe | G06F 17/5004 703/6 |
| 2007/0288207 A1 | 12/2007 | Backe et al. | 703/1 |
| 2008/0015824 A1 | 1/2008 | Grichnik et al. | |
| 2008/0209907 A1 | 9/2008 | Xiao et al. | 60/641.15 |
| 2008/0309678 A1 | 12/2008 | Reghetti et al. | |
| 2009/0024374 A1 | 1/2009 | Zielinski et al. | 703/8 |
| 2009/0076779 A1* | 3/2009 | Simmons | B60H 1/00642 703/1 |
| 2009/0307255 A1 | 12/2009 | Park | |
| 2010/0066559 A1 | 3/2010 | Judelson | |
| 2010/0138762 A1 | 6/2010 | Reghetti et al. | |
| 2010/0217724 A1 | 8/2010 | Wayne et al. | |
| 2010/0223032 A1 | 9/2010 | Reghetti et al. | |
| 2012/0072181 A1 | 3/2012 | Imani | 703/1 |
| 2012/0101778 A1 | 4/2012 | Gyota et al. | 702/183 |
| 2013/0261805 A1* | 10/2013 | Kuroiwa | F24F 11/0086 700/276 |

FOREIGN PATENT DOCUMENTS

| | | |
|---|---|---|
| CN | 102033992 | 4/2011 |
| CN | 102782689 | 11/2012 |
| EP | 1 939 813 A1 | 7/2007 |
| EP | 2 442 042 A1 | 4/2012 |
| JP | 2009530720 A | 8/2009 |
| KR | 10-2002-0002894 | 1/2002 |
| WO | WO 2010/143340 A1 | 12/2010 |
| WO | WO 2012/101787 | 8/2012 |

OTHER PUBLICATIONS

International Search Report dated Apr. 4, 2014 issued in application No. PCT/KR 2013/010813.
European Search Report dated Apr. 14, 2014 issued in application No. 13171829.8.
Korean Office Action dated Dec. 11, 2015 issued in Application No. 10-2012-0135501.
U.S. Office Action dated May 12, 2016 issued in co-pending U.S. Appl. No. 14/071,940.
Korean Office Action dated Jul. 12, 2016 issued in Application No. 10-2012-0135403.
Chinese Office Action dated Jul. 19, 2016 issued in Application No. 201380008599.7.
U.S. Office Action dated Aug. 11, 2016 issued in co-pending U.S. Appl. No. 14/072,110.
Chinese Search Report dated Jun. 17, 2016 issued in Application No. 2013800085785.
Chinese Search Report dated Jun. 21, 2016 issued in Application No. 2013800085770.
U.S. Appl. No. 14/072,045, filed Nov. 5, 2013.
U.S. Office Action dated Oct. 19, 2016 issued in co-pending U.S. Appl. No. 14/071,940.
United States Office Action dated May 8, 2017 issued in co-pending U.S. Appl. No. 14/072,110.
U.S. Notice of Allowance dated Jun. 30, 2017 issued in co-pending U.S. Appl. No. 14/071,940.
U.S. Appl. No. 14/071,940, filed Nov. 5, 2013.
U.S. Appl. No. 14/072,110, filed Nov. 5, 2013.

* cited by examiner

INSTALLATION GUIDE SYSTEM FOR AIR CONDITIONER AND METHOD OF USING THE SAME

CROSS-REFERENCE TO RELATED APPLICATION(S)

This application claims priority under 35 U.S.C. §119 to Korean Application No. 10-2012-0135501 filed in Korea on Nov. 27, 2012, whose entire disclosure(s) is/are hereby incorporated by reference.

BACKGROUND

1. Field

Provided is an installation guide system for an air conditioner and a method of using the same.

2. Background

Installation guide systems for air conditioners and methods of using the same are known. However, they suffer from various disadvantages.

Air conditioners are home appliances that maintain indoor air into the most proper state according to use and purpose thereof. For example, such an air conditioner cools indoor air in the summer and heats indoor air in the winter. Furthermore, the air conditioner may control humidity of the indoor air and may purify the indoor air to provide a more pleasant and clean air.

In detail, the air conditioner has a refrigeration cycle in which compression, condensation, expansion, and evaporation processes for a refrigerant are performed. Thus, a cooling or heating operation of the air conditioner may be performed to cool or heat the indoor air according to the refrigeration cycle.

Such an air conditioner may be classified into a split type air conditioner in which indoor and outdoor units are separated from each other and an integral type air conditioner in which indoor and outdoor units are integrally coupled to each other as a single device, according to whether the indoor and outdoor units are separated from each other.

The outdoor unit includes an outdoor heat exchanger heat-exchanging with external air, and the indoor unit includes an indoor heat exchanger heat-exchanging with indoor air. The air conditioner may operate in a cooling mode or heating mode which are capable of being converted with respect to each other.

An air conditioner may be installed so that a plurality of indoor or outdoor units may be provided in one building. Particularly, in a case of a commercial air conditioner, high-capacity outdoor units may be disposed outside the building, and indoor units may be installed so that the indoor units are respectively disposed in a plurality of spaces of the floors.

In the air conditioner according to the related art, an adequate number of indoor or outdoor units may be provided in consideration of a size and structure of the building and the number of persons to be accommodated within the building so that the indoor or outdoor units are adequately designed in a building design phase to adequately locate the indoor or outdoor units in the building. Also, while the building is being designed, the adequate number of outdoor or indoor units should be selected in consideration of the conditions of the building. In addition, a position of a refrigerant tube, a branch tube, or drain tube and a constitution of a controller should be considered.

However, according to the process of designing the air conditioner in the building, a design drawing of the building and a design drawing of the air conditioner are drawn along different work flows. Thus, since the plurality of drawings may not match each other, it may be difficult to efficiently design the building and install the air conditioner.

Also, since communication between an installer and a user with respect to installation information (building information or capacity of the air conditioner) of the air conditioner may not effectively be performed, the number of outdoor and indoor units which are actually required may not be provided, or the refrigerant tube, and the like, may not be disposed in adequate positions in the building. Also, in the case where the air conditioner is not adequately installed in the building, cooling or heating efficiency of the air conditioner may be reduced during the operation thereof or may cause failures.

The above references are incorporated by reference herein where appropriate for appropriate teachings of additional or alternative details, features and/or technical background.

The details of one or more embodiments are set forth in the accompanying drawings and the description below. Other features will be apparent from the description and drawings, and from the claims.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. The disclosure may, however, be embodied in many different forms and should not be construed as being limited to the embodiments set forth herein; rather, that alternate embodiments included in other retrogressive disclosures or falling within the spirit and scope of the present disclosure will fully convey the concept of the disclosure to those skilled in the art.

Figure 1:
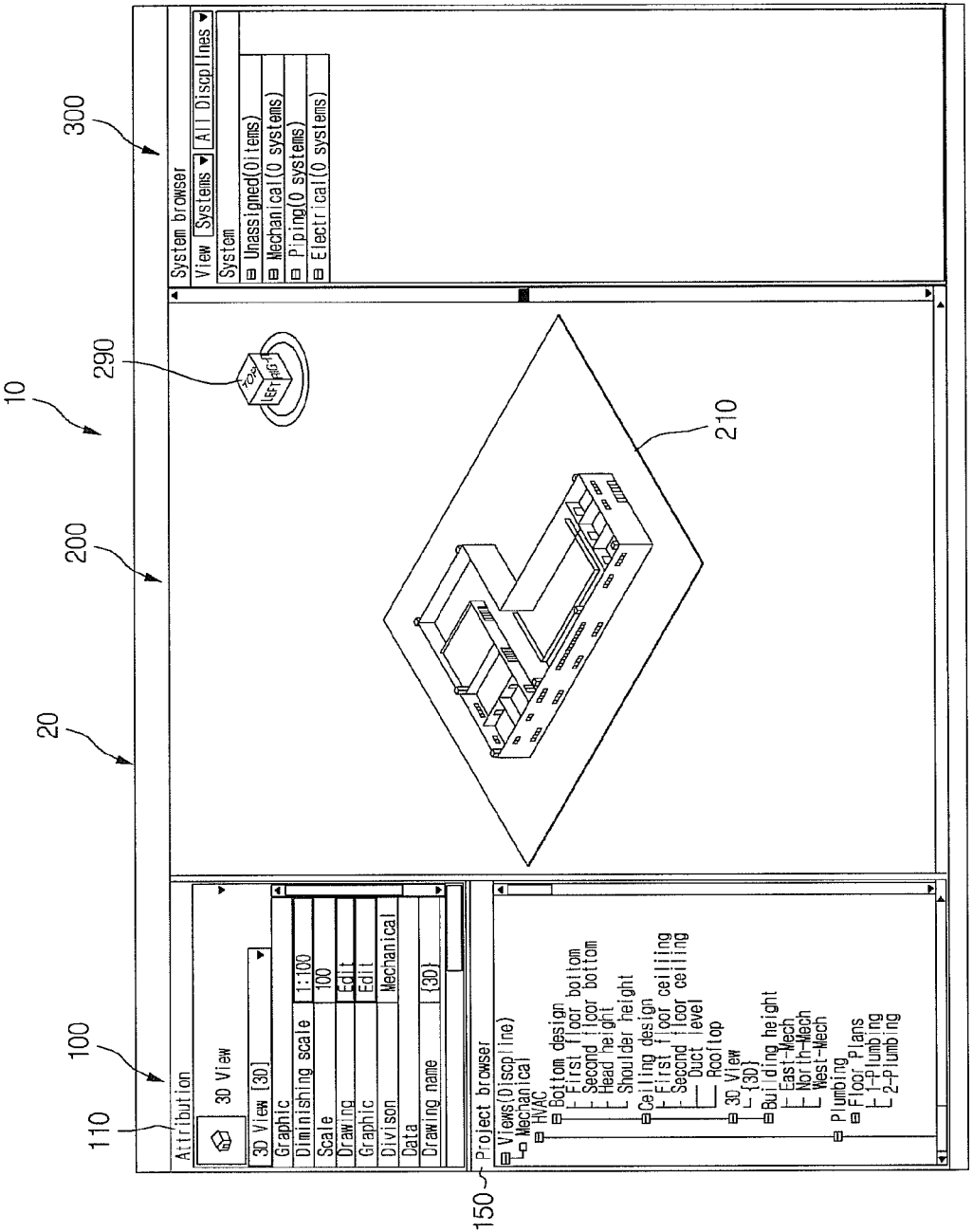
FIG. 1 is a view of an installation guide system according to an embodiment.

FIG. 1 is a view of an installation guide system according to an embodiment. An installation guide system 10 (hereinafter, referred to as a system) may include a display 20 providing guide for an installation (a disposition design) of an air conditioner to a user. The display 20 may be displayed when preset information (e.g., specific program) is executed. The display 20 may be understood as a user interface that outputs information required according to a command input of the user. Here, the specific program may be executed in PCs, terminals, servers, control devices, or another appropriate type of computing device based on the intended application.

The display 20 may include an installation information display part 100 including attribution information of the system 10, project (installation process) information for installing the air conditioner, and information (for example, building information) related to an installation space in which the air conditioner is installed. The installation information display part 100 may be disposed in a partitioned region of the display 20. The installation information display part 100 may be a partitioned window, a window pane, a pop-up window, or the like.

In detail, the installation information display part 100 may include an attribution information display part 110 ("Attribution") on which the attribution information of the system 10 is displayed. The attribution display part 110 may include display information with respect to a drawing included in the system 10. For example, the display information may include drawing scale information, graphic information, scale information, or the like.

The installation information display part 100 may include a project display part 150 ("Project Browser") on which information with respect to floor and ceiling designs of the building and information with respect to a height of the building are displayed.

The project display part 150 may include a display part (hereinafter, referred to as a bottom design display part) for confirming or inputting information with respect to the bottom design of the building. For example, when the building has two floors, the bottom design display part may include information with respect to a "first floor bottom," a "second floor bottom," a "head height," and a "shoulder height."

The project display part 150 may include a display part (hereinafter, also referred to as a ceiling design display part) for confirming or inputting information with respect to the ceiling design of the building. For example, when the building has two floors, the ceiling design display part may include information with respect to a "first ceiling mech" and a "second ceiling mech." Also, the two floor ceiling mech may include information with respect to a "duct level (height)" and a "rooftop," for example.

The project display part 150 may include a display part (hereinafter, also referred to as a building height display part) for confirming or inputting information with respect to the height of the building. The building height display part may include a plurality of selection parts for distinguishing and displaying the height of the building according to a view direction. The plurality of selection parts may include an "east-mech" selection part, a "west-mech" selection part, and a "north-mech" selection part.

The display 20 may include a drawing display part 200 on which information with respect to an installation space of the air conditioner, for example, floor information of the building or room information may be displayed, or disposition information of detailed devices (equipment or components) of the air conditioner may be displayed. The room information may be information with respect to rooms partitioned on each of the floors of the building. Moreover, the drawing display part 200 may be referred to as a window, pane, partition of the display, or the like, which may be separated in the display 20 or viewed as a pop-up window. A drawing with respect to a structure of the building (e.g., floor plan) may be disposed on the drawing display part 200, and installation information may be displayed on the drawing. The drawing display part 200 may be displayed on the other region of the entire region of the display 20.

For example, as shown in FIG. 1, the drawing display part 200 may include a building perspective view 210 on which the structure of the building is three-dimensionally displayed.

Information with respect to a plurality of buildings may be previously stored in the system 10. When one building of the plurality of buildings is imported, as shown in FIG. 1, a structure of a specific building may be displayed as a perspective view.

The drawing display part 200 may include a viewer adjustment part 290 for adjusting a view direction of the building perspective view 210. The user may select the viewer adjustment part 290 to rotate in a specific direction, thereby differently setting the view angle of the building perspective drawing 210. The viewer adjustment part 290 may be an icon or the like.

The display 20 may include a product information display part 300 ("System Browser") for displaying the detailed constitutions (equipment or components) of the air conditioner disposed in each of the floors or each of the rooms. The product information display part 300 may be displayed in the other region of the entire region of the display 20.

For example, the display 20 may be divided into three regions. Thus, the installation information display part 100, the drawing display part 200, and the product information display part 300 may be disposed in each of the three regions, respectively. Also, the installation information display part 100 and the product information display part 300 may be disposed on both sides of the drawing display part 200.

The installation information display part 100 and the product information display part 300 may be commonly called a "guide display part" in that various menus for disposing the air conditioner on the drawing display part 200 are displayed thereon.

Figure 2:
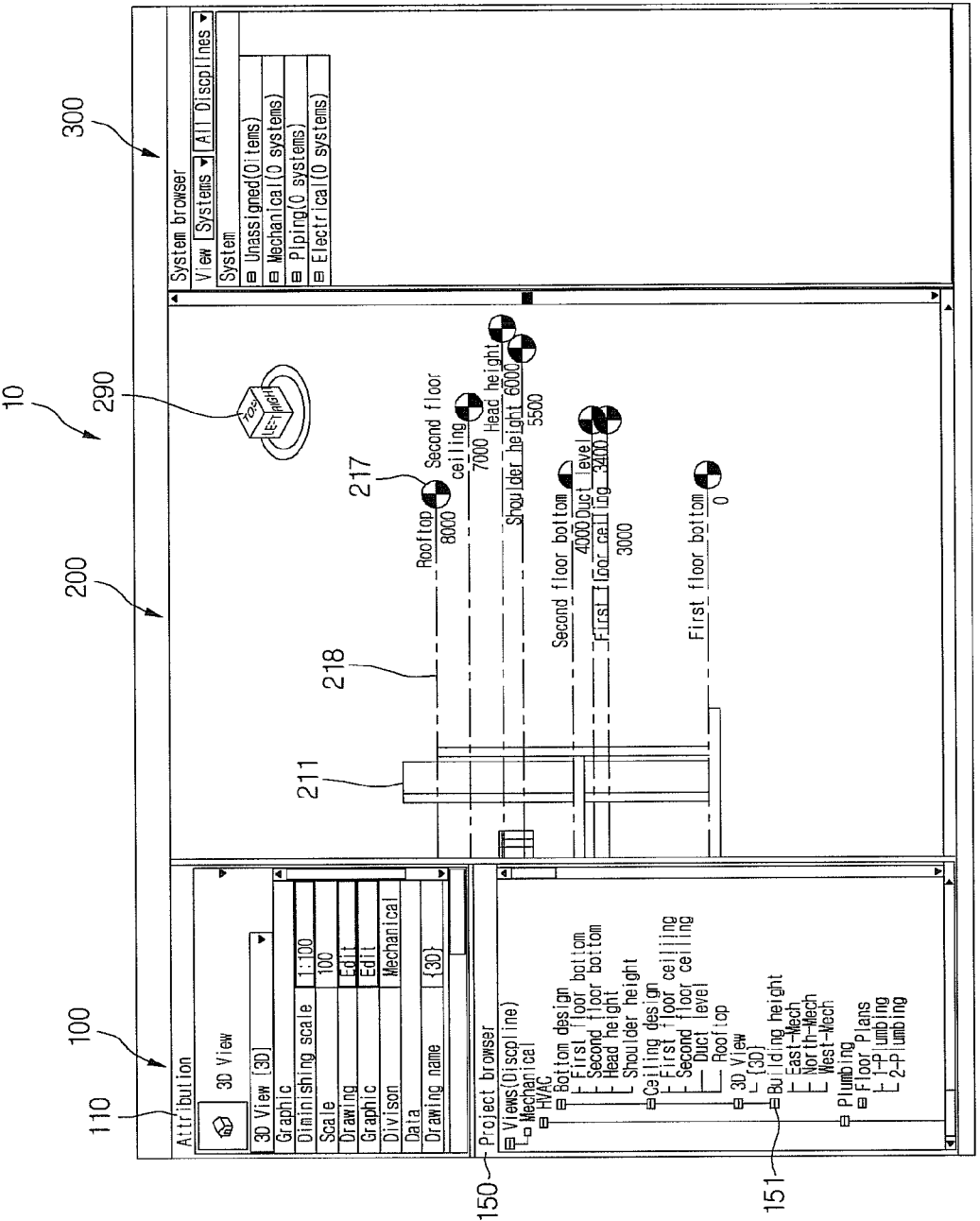
FIG. 2 is a view of the installation guide system with respect to a drawing display part including building level information according to an embodiment.

FIG. 2 is a view of the installation guide system with respect to a drawing display part including building level information according to an embodiment. A front view 211 and height information with respect to the bottom and floor of the building based on the front view 211 may be displayed on the drawing display part 200. Of course, the drawing and the height information may be previously stored in the system 10.

For example, when the building height display part 151 of the project display part 150 is selected, at least one portion of the front view 211 of the building may be displayed on the drawing display part 200, and the information with respect to a height from the bottom of the building to the rooftop of the building may be displayed in a region spaced apart from where the front view 211 is displayed.

For example, when the building has two floors, a plurality of position display parts 217 may be displayed in regions spaced laterally from the front view 211. Positions of components of the building, from the "first floor bottom" that is the lowermost portion relative to the "rooftop" that is the uppermost portion, may be longitudinally displayed.

That is, the position display parts 217 are displayed in a vertical direction to correspond to the components of the building displayed on the front view 211 of the building, as illustrated in FIG. 2. The position display parts 217 may include a "first floor bottom," a "first floor ceiling," a "duct level," a "second floor bottom," a "shoulder height," a "head height," a "second ceiling," a "rooftop" from a lower side to an upper side, or another appropriate measurement.

Also, heights (levels) with respect to each of the components of the building may be displayed on the position display parts 217, respectively. For example, as shown in FIG. 2, the first floor bottom, the first ceiling, the duct level, the second floor bottom, the shoulder height, the head height, the second floor ceiling, and the rooftop may be displayed as about 0, about 3,000 mm, about 3,400 mm, about 4,000 mm, about 5,500 mm, about 6,000 mm, about 7,000 mm, and about 8,000 mm, respectively.

Here, the shoulder height and the head height may be utilized as reference information for installing the air conditioner. For example, the shoulder height and the head may correspond to a height of a window provided in the building or a position of an air discharge hole of the air conditioner.

Level display lines 218 that horizontally extend from the front view 211 to the position display parts 217 may be displayed on the drawing display part 200. The plurality of level display lines 218 may be longitudinally disposed and spaced apart from each other to correspond to the respective components (the rooftop, the ceiling, the bottom, and the like) of the building.

Since the level display lines 218 are provided, the components of the building illustrated in the front view 211 and names of the components displayed on the position display parts 217 may easily be matched to each other.

As described above, since the information with respect to the height of each of the components of the building is displayed on the drawing display part 200 so that the user can see the height information, the air conditioner may be easily and accurately installed.

Figure 3:
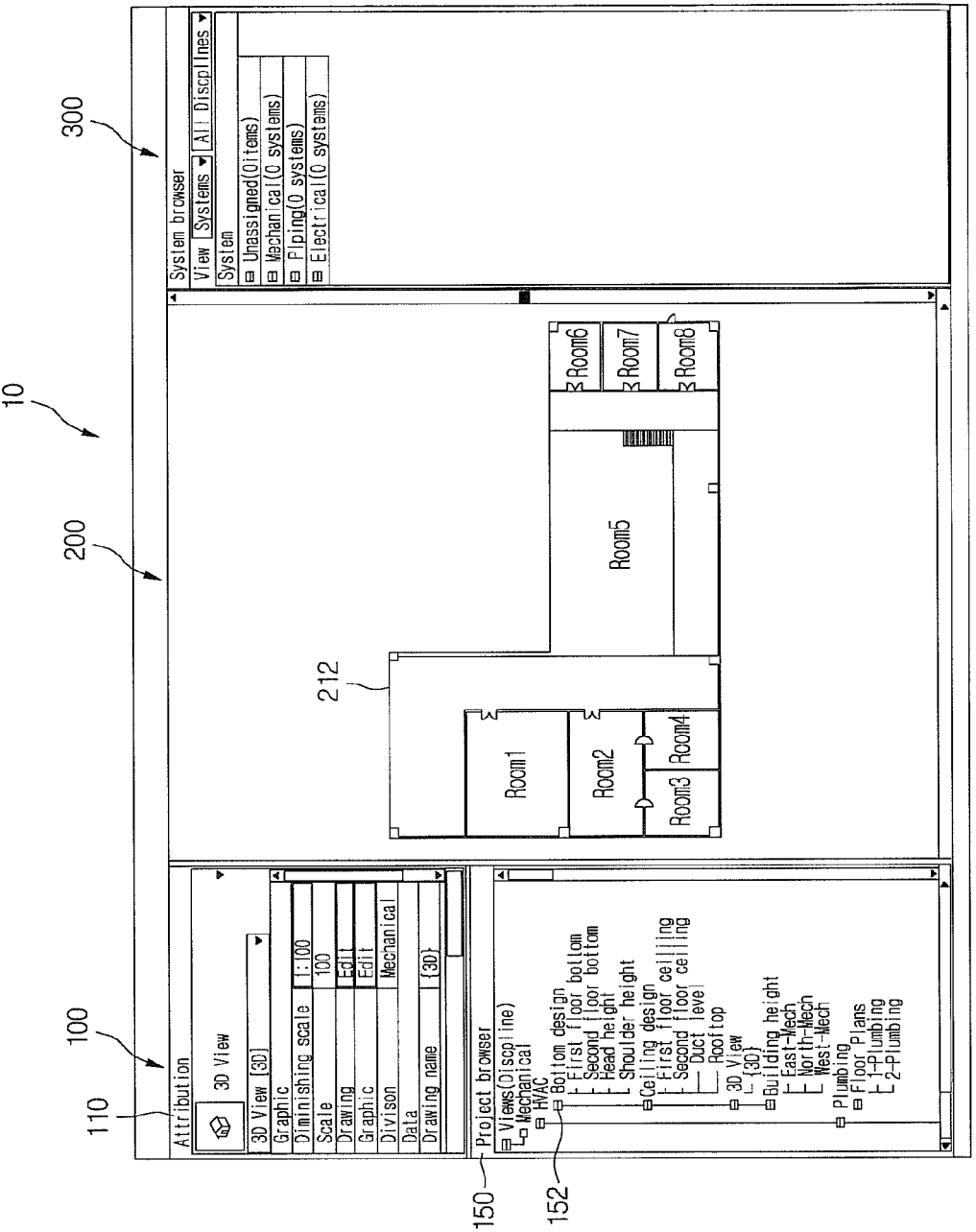
FIG. 3 is a view of the installation guide system with respect to a drawing display part including a building plan view according to an embodiment.

FIG. 3 is a view of the installation guide system with respect to a drawing display part including a building plan view according to an embodiment. A building plan view 212 may be displayed on the drawing display part 200 of the system 10.

In detail, when a bottom design display part 152 of the project display part 150 is selected, the room information with respect to each of the rooms of the building may be displayed on the drawing display part 200. For example, FIG. 3 illustrates a state in which the building plan view 212 including the room information of the second floor of the building when the "second floor bottom" of the bottom design display part is selected.

Also, when an inner region of the building plan view 212 is selected, a room information display part (not shown) may be displayed, for example, in a pop-up window. The room information display part may include information with respect to a room located in each of the floors of the building, for example, a cooling/heating load or capacity of the indoor unit.

As described above, since the information with respect to the room in which the air conditioner is installed may previously be set, the indoor or outdoor unit having specific capacity may be adequately disposed on the basis of the information with respect to the room.

Figure 4:
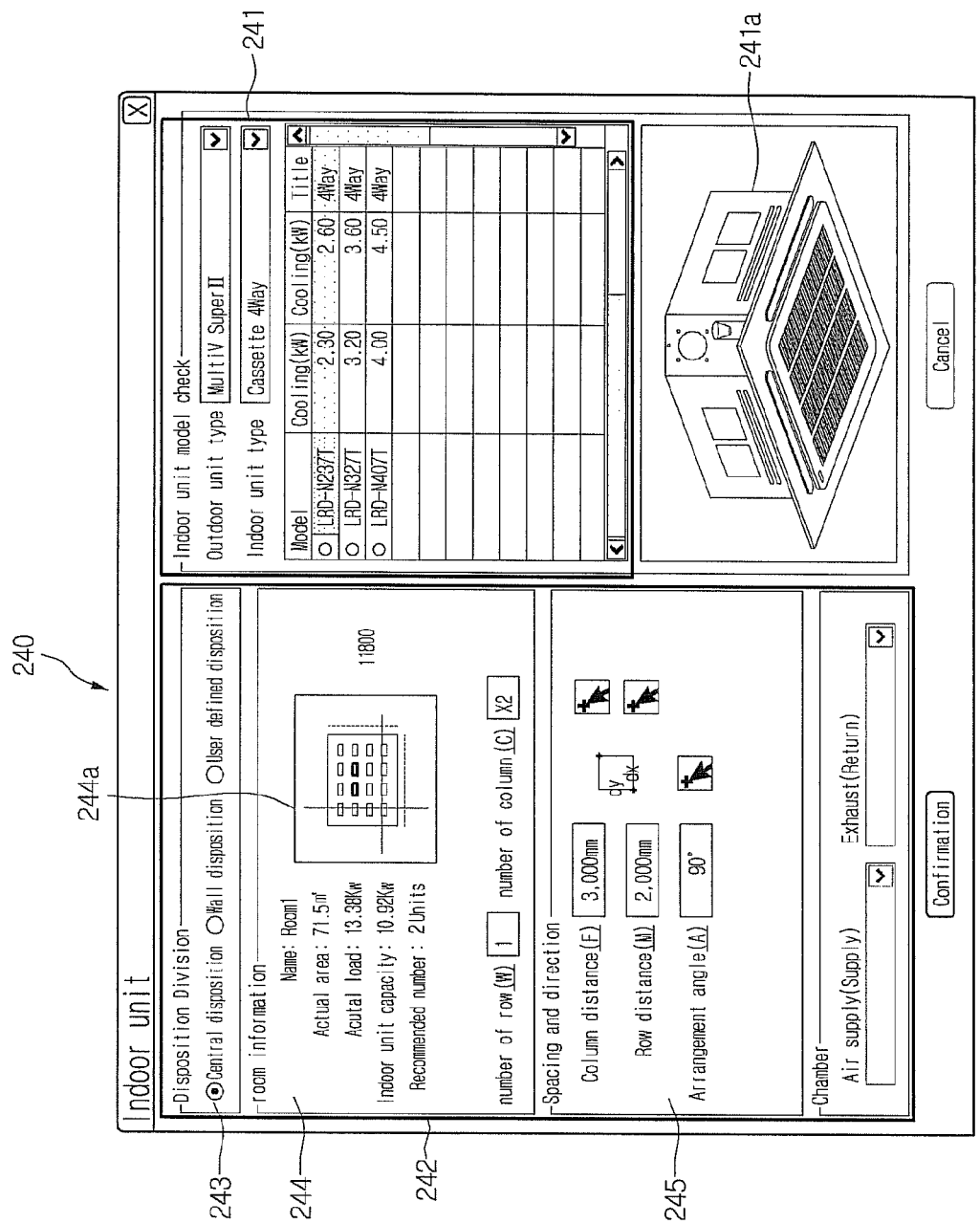
FIG. 4 is a view of an indoor unit automatic disposition display part according to an embodiment.
Figure 5:
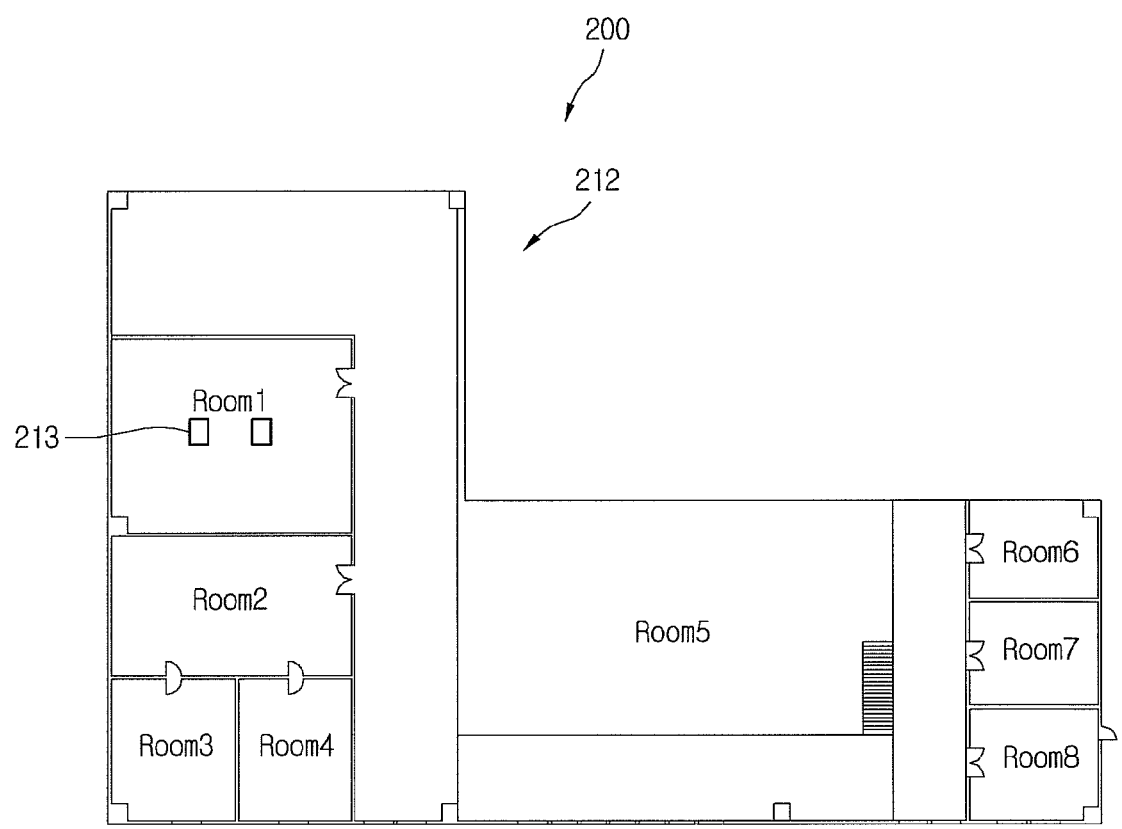
FIGS. 5 and 6 are views of a drawing display part on which an indoor unit is automatically displayed according to an embodiment.
Figure 6:
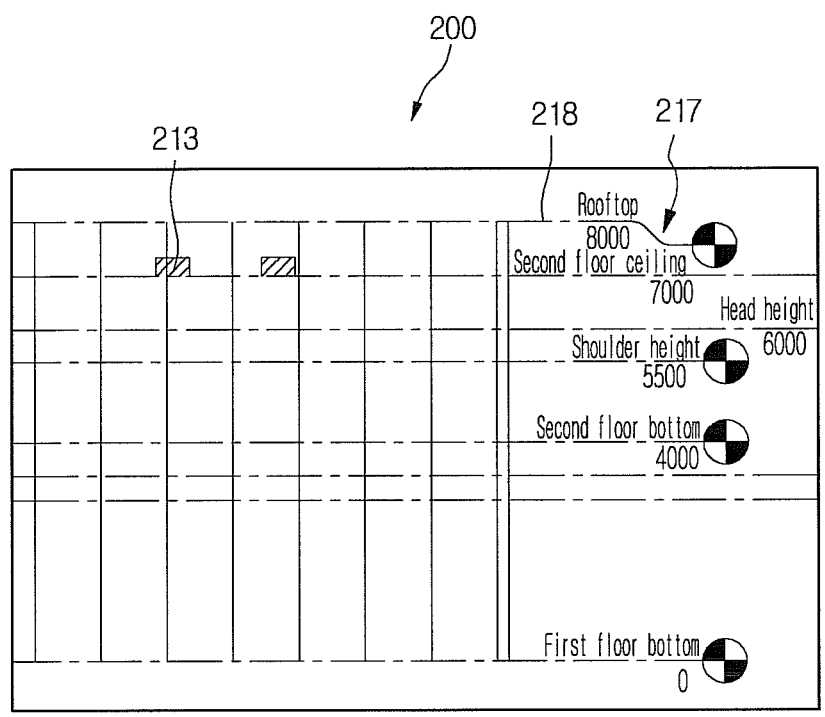

FIG. 4 is a view of an indoor unit automatic disposition display part according to an embodiment, and FIGS. 5 and 6 are views of a drawing display part on which the indoor unit is automatically displayed according to an embodiment.

When a specific input part included in the system 10 is inputted, as shown in FIG. 4, an indoor unit automatic disposition display part 240 may be displayed on the display 20.

The indoor unit automatic disposition display part 240 may include a model display part 241 for selecting a type or model of the indoor unit to be installed, a shape display part 241a on which a shape of the indoor unit having the model selected in the model display part 241 is displayed, and a disposition information display part 242 on which disposition information with respect to the indoor unit having the selected model.

The disposition information display part 242 may include a disposed position of the indoor unit, e.g., a disposition division display part 243 ("Disposition Division") for selecting whether the indoor unit is installed at a center of the room or on a wall, a room information display part 244 ("room information") for displaying information of a room in which the indoor unit is installed, and an arrangement set display part 245 ("Spacing and Direction") for displaying information with respect to a disposition distance of the indoor unit.

The disposition division display part 243 may include a plurality of selectable disposition divisions. The plurality of disposition divisions may include a "central disposition" in which the selected indoor unit is disposed with respect to a center of the corresponding room, a "wall disposition" in which the selected indoor unit is disposed with respect to four directional walls, and a "user defined disposition" in which a user sets a disposition reference point of the indoor unit.

A room area and load information (e.g., actual load information) and information with respect to capacity of the indoor unit may be disposed on the room information display part 244. In detail, when one model of the indoor unit is selected through the model display part 241, capacity information with respect to the selected model (indoor unit), area information with respect to the room, and load information may be displayed.

Also, an optimum number of selected indoor units to be installed in the corresponding room may be recommended on the basis of the above-described information. That is, the "recommended number" of selected indoor units may be displayed on the room information display part 244. Thus, since the recommended number of indoor units that should be disposed and how the indoor units should be arranged according to the capacity of the indoor, the actual area, and the load information are provided, user convenience may be improved.

Information with respect to column and row of the indoor units to be disposed, e.g., information with respect to the number C of columns and the number W of rows may be inputted into the room information display part 244. The number C of columns and the number W of rows may be previously determined as predetermined values according to the recommended number and then displayed on the room information display part 244. That is, the number of indoor units to be installed and the information C and W with respect to the column and row may be recommended to the user. However, the user may change the information to reflect a desired number of columns and rows.

The room information display part 244 may include a plan disposition view 244a that illustrates a plan disposition of the indoor units according to the recommended number and the number C and W of columns and rows.

The information with respect to the columns and rows of the indoor units, e.g., the C*W values may be understood as the number of indoor units to be installed. The recommended number and the inputted indoor unit number C*W may correspond to each other or be different from each other. When the recommended number and the indoor unit number C*W are different from each other, the indoor units may be disposed according to the number C*W of the indoor units inputted by the user and the column and row information.

Also, when the number of indoor units recommended by the system 10 and the column and row information and the information inputted or adjusted by the user are different from each other, the arrangement of the indoor units installed according to the information inputted by the user may be displayed on the plan disposition view 244a.

Information with respect to how the inputted indoor unit number C*W are arranged, e.g., arrangement information may be displayed on the arrangement set display part 245. The arrangement information may include a distance F (hereinafter, referred to as a column distance) between one indoor unit and the other indoor unit which constitute the columns, a distance M (hereinafter, referred to as a row distance) between one indoor unit and the other indoor unit which constitute the rows, and an angle A (hereinafter, referred to as an arrangement angle) of the column of the indoor unit to the wall of the room with respect to the column and row information.

The information with respect to the column distance F, the row distance M, and the arrangement angle A may be inputted. Also, the indoor units may be automatically disposed in the corresponding rooms on the basis of the information inputted into the arrangement set display part 245. Moreover, the information with respect to the arrangement angle A may be changed. Since the arrangement angle A may be corrected to simply change the arrangement of the indoor units, the disposition design of the indoor units may be made easier.

As described above, since the indoor units may be automatically disposed in the corresponding rooms when the type and model of the indoor unit to be installed by the indoor unit automatic disposition system, it may not be necessary to dispose the indoor units one by one on the drawing display part 200 by the user. A process of inputting data to the indoor unit automatic disposition display part 240 is described with reference to FIGS. 3 and 4.

The user may select one room in which the indoor unit is installed on the building plan view 212 of FIG. 3. The selection may be performed by designating a predetermined region along a boundary between the rooms, e.g., an outer boundary by using a mouse. For example, as shown in FIG. 4, Room 1 of a plurality of rooms may be designated.

The user selects one type of indoor unit from the "outdoor unit type" displayed on the model display part 241 and then selects one type of indoor unit that matches the selected indoor from the "indoor unit type." For example, as shown in FIG. 4, a "Multi V Super II" may be selected from the "outdoor unit type," a "Cassette 4 Way" may be selected from the "indoor unit type."

When one type of indoor unit is selected from the "indoor unit type," a plurality of indoor unit models belonging to the selected type may be displayed. When one model of the plurality of indoor unit models is selected, a shape of the indoor unit having the selected model may be displayed on the shape display part 241a. As illustrated in the example of FIG. 4, the model of the selected indoor unit may be a "ceiling type indoor unit" installed on a ceiling.

The user may select a desired disposition division from the disposition division display part 243 (e.g., a central disposition as shown in FIG. 4). Information with respect to the selected Room 1, e.g., the room area, the room load, and the capacity of the selected indoor unit, may be displayed on the room information display part 244.

Also, the adequate number of indoor units to be installed may be recommended and displayed on the room information display part 244 on the basis of the information with respect to the Room 1 and the capacity of the indoor unit (two indoor units in FIG. 4). The user may input or correct the columns and rows of the indoor units according to the recommended number of indoor units.

The information with respect to the specific column distance, row distance, and arrangement angle may be displayed on the arrangement set display part 245 according to the set number of indoor units and the room area. However, the user may correct the information with respect to the column and row distances and the arrangement angle.

As described above, when a "confirmation button" is selected after the information displayed on the indoor unit automatic disposition display part 240 is confirmed or inputted, as shown in FIG. 5, the indoor units may be automatically disposed in the corresponding rooms of the building plan view (212). Here, the user may designate the region (the installation region of the indoor unit) corresponding to the Room 1 on the drawing display part 200.

For example, as shown in FIG. 5, two indoor units may be disposed spaced apart from each other, on a central portion of the ceiling of the Room 1. Also, two indoor unit display parts 213 corresponding to the indoor units may be displayed to be within the displayed boundary of Room 1.

When the building height display part 151 of the project display part 150 is selected in the state where the indoor units are automatically disposed, as shown in FIG. 6, the level or height of each of components of the building and a configuration of the ceiling type indoor unit may be displayed on the drawing display part 200.

In detail, FIG. 6 illustrates a state in which the indoor unit display part 213 is disposed on a ceiling of the second floor at a height of about 7,000 mm (about 23 feet) that is spaced upward from the first floor bottom. Here, as described in FIG. 2, the plurality of level display lines 218 and the position display part 217 are disposed on the drawing display part 200.

Figure 7:
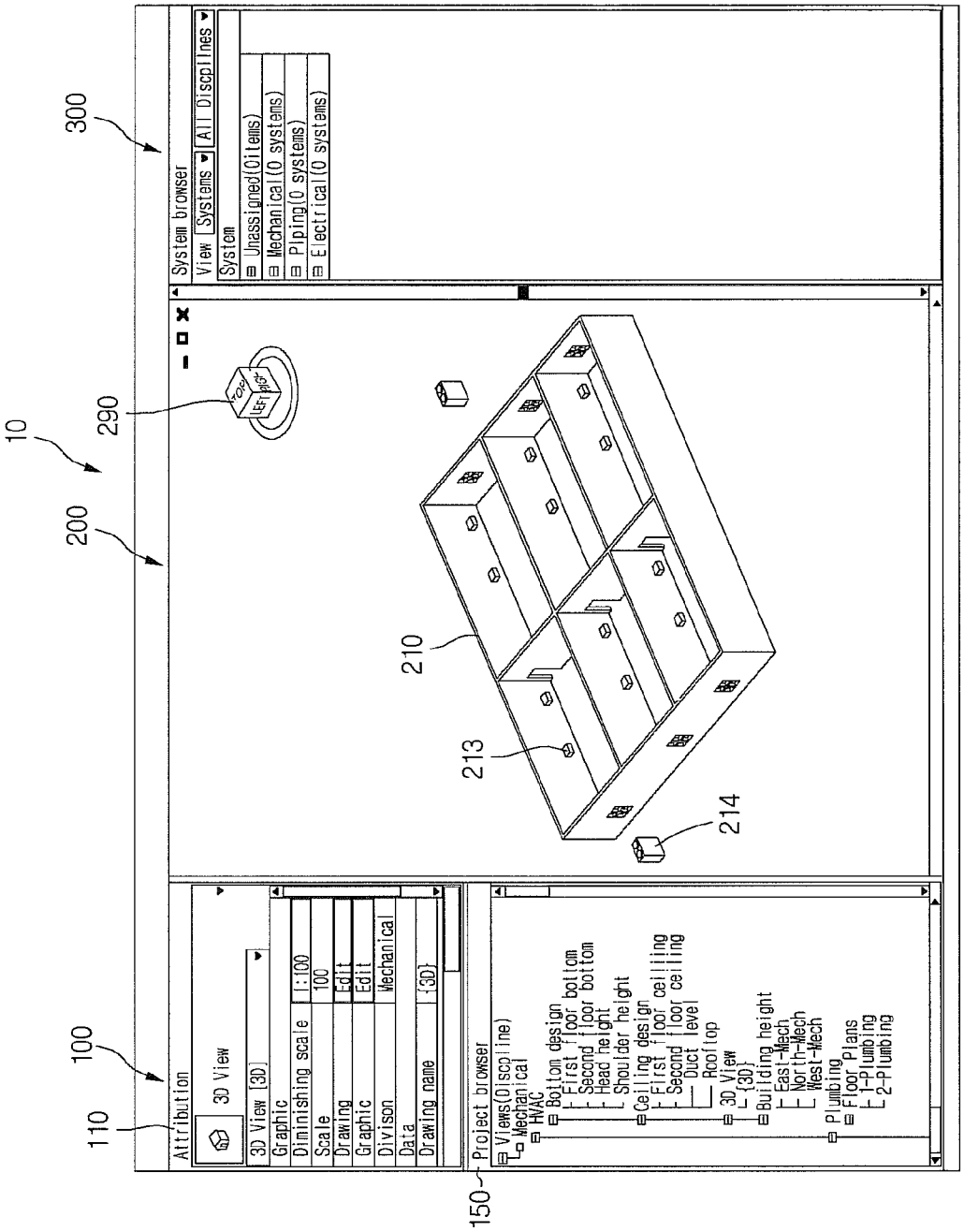
FIG. 7 is a view of the installation guide system including the drawing display part on which the indoor unit is automatically disposed according to an embodiment.

FIG. 7 is a view of the installation guide system including the drawing display part on which the indoor unit is automatically disposed according to an embodiment. When the indoor units are automatically disposed in the plurality of rooms through the method described in FIGS. 4 to 6, the building perspective view 210 including the plurality of indoor unit display parts 213 may be displayed on the drawing display part 200.

Also, an outdoor unit display part 214 may be displayed on an outer region of the building perspective view 210 on the drawing display part 200. The outdoor unit display part 214 may be understood as the outdoor unit corresponding to the automatically disposed indoor unit which are displayed.

The disposition of the outdoor unit may be performed before or after the indoor unit of FIGS. 4 to 6 is automatically disposed. When a model of the outdoor unit to be installed is selected, and a predetermined region (an installation position region) is set on the drawing display part 200, the outdoor unit display part 214 may be disposed in the predetermined region of the drawing display part 200.

The viewer adjustment part 290 may be disposed on a side of the building perspective view 210. When the viewer adjustment part 290 is selected to rotate in a predetermined direction, the building perspective view 210 may be changed in shape according to the rotation direction. As described above, the viewer adjustment part 290 may be adjusted to easily confirm the installed configurations of the indoor and outdoor units within the building.

Figure 8:
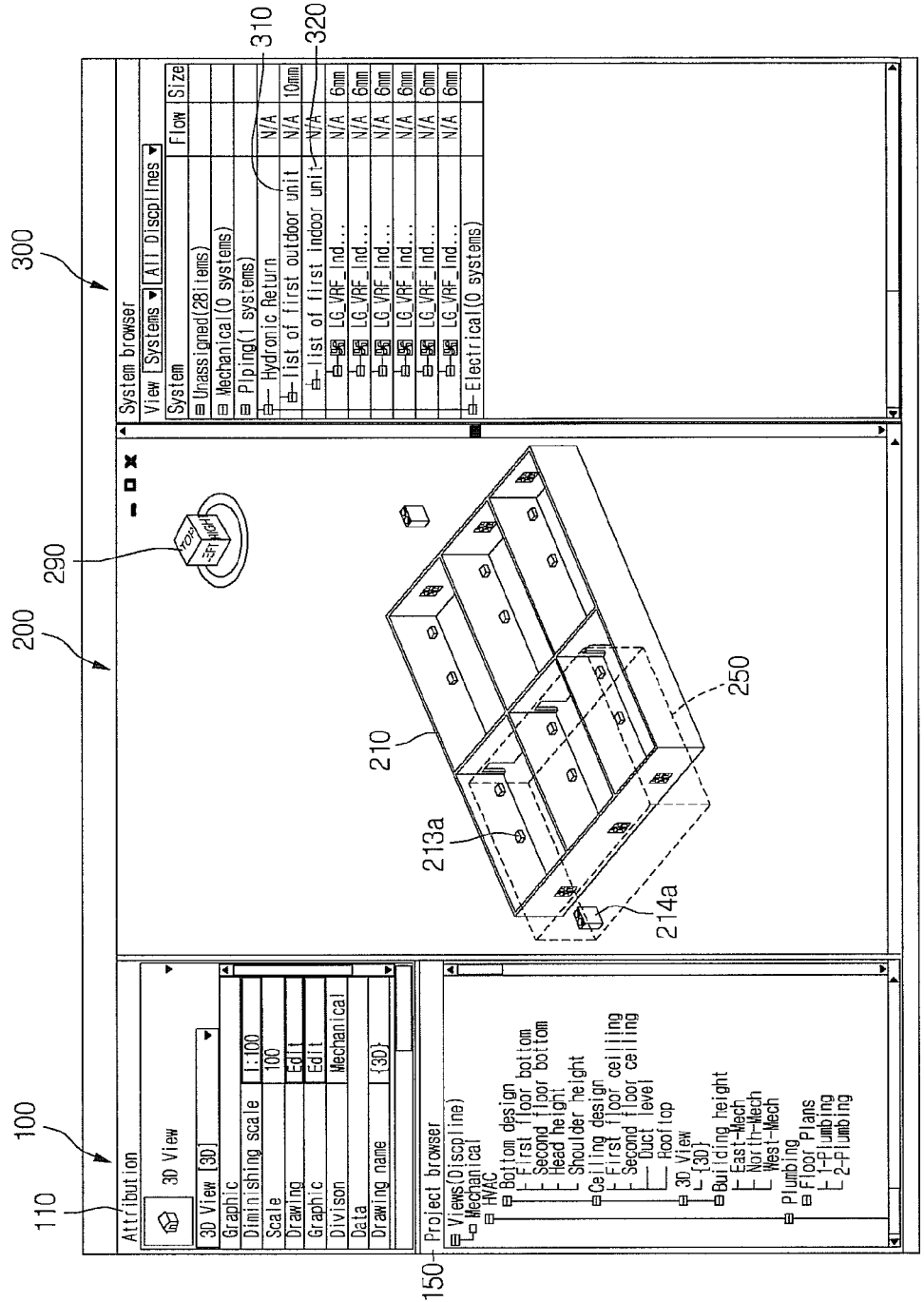
FIG. 8 is a view of the installation guide system in which a first group of outdoor and indoor units is defined to connect tubes to each other according to an embodiment.
Figure 9:
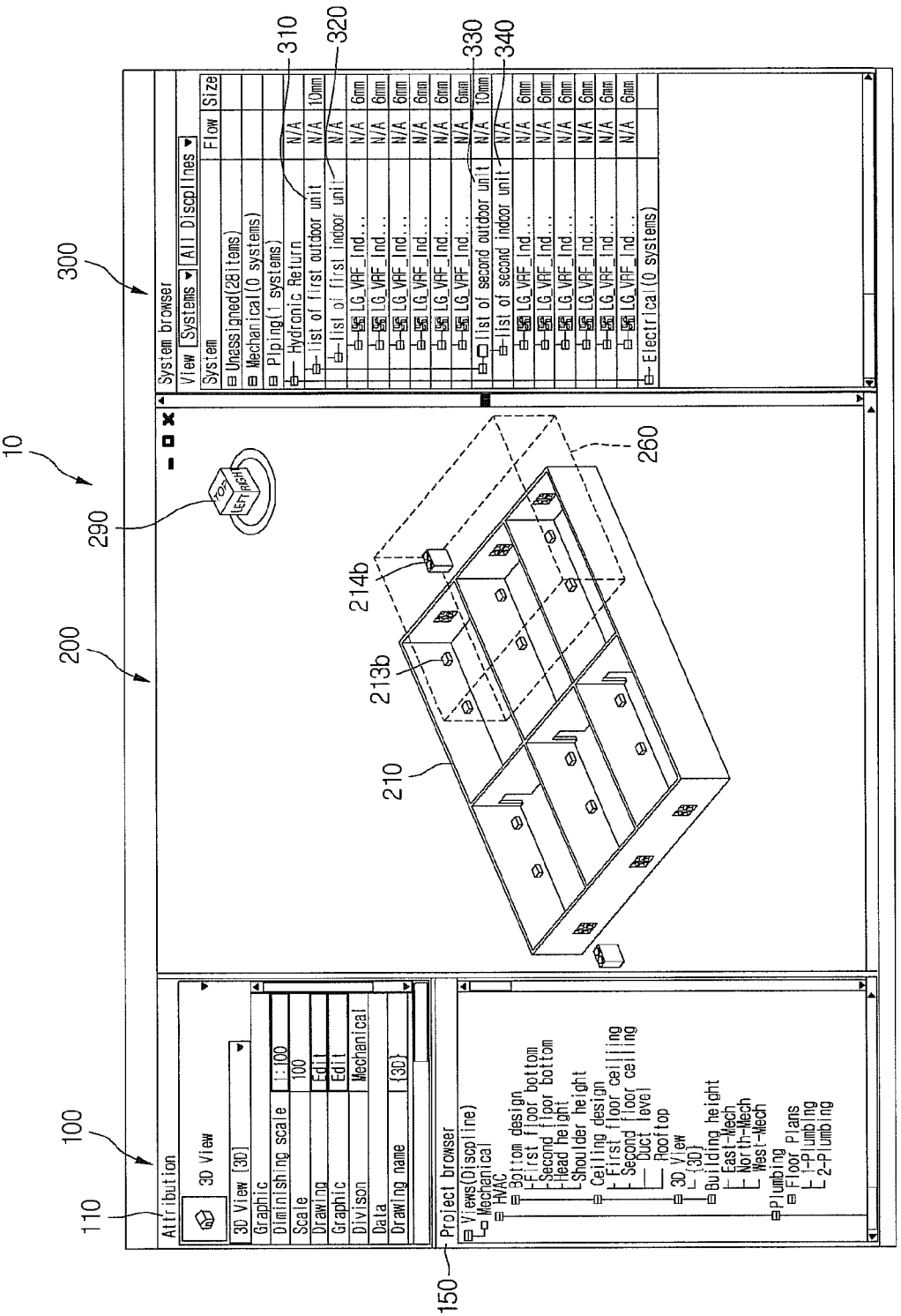
FIG. 9 is a view of the installation guide system in which a second group of outdoor and indoor units is defined to connect tubes to each other according to an embodiment.

FIG. 8 is a view of the installation guide system in which a first group of outdoor and indoor units is defined to connect tubes to each other according to an embodiment, and FIG. 9 is a view of the installation guide system in which a second group of outdoor and indoor units is defined to connect tubes to each other according to an embodiment.

Referring to FIG. 8, a first group of indoor and outdoor units for connecting tubes to each other may be designated in a state where the indoor and outdoor units are disposed on the drawing display part 200.

In detail, the drawing display part 200 may include a first indoor unit display part 213a indicating one or more indoor units disposed on a side of the inside of the building (a room of the first group) and a first outdoor unit display part 214a indicating an outdoor unit disposed outside the building.

Also, the drawing display part 200 may further include a first system connection line 250 connecting the plurality of first indoor unit display parts 213a and the first outdoor unit display parts 214a to each other to form one air conditioner system. A process for forming the first system connection line 250 will be described hereinafter.

First, the first outdoor unit display part 214a is designated. For example, the first outdoor unit display part 214a may be selected by using a mouse, or an outer region including the first outdoor unit display part 214a may be dragged using the mouse to designate the first outdoor unit display part 214a.

Then, the plurality of first indoor unit display part 213a may be designated. For example, the plurality of first indoor unit display parts 213a may be selected by using the mouse, an outer region including the plurality of indoor unit display parts 213a may be dragged to designate the plurality of first outdoor unit display parts 214a. It should be appreciated that the desired indoor unit display parts 213a may also be selected individually.

When the first outdoor unit display part 214a and the plurality of first indoor unit display parts 213a are completely designated, the first system connection line 250 may be displayed on the drawing display part 200. The first system connection line 250 may be displayed to define a specific region so that the first system connection line 250 includes the first outdoor unit display part 214a and the plurality of first indoor unit display parts 213a therein. For example, as shown in FIG. 8, the first system connection line 250 may have a hexahedral shape.

Also, a first outdoor unit list 310 corresponding to the designated first outdoor unit display part 214a may be displayed on the product information display part 300. A type and/or model name corresponding to the outdoor unit may be displayed on the first outdoor unit list 310.

Also, a first indoor unit list 320 corresponding to the plurality of designated indoor unit display parts 213a may be displayed on the product information display part 300. The type and/or model names of the plurality of indoor units may be displayed on the first indoor unit list 320 to correspond to the designated indoor unit display part 213a.

Referring to FIG. 9, a second group of outdoor and indoor units connecting the tubes to each other may be designated. In detail, the drawing display part 200 may include a plurality of second indoor unit display parts 213b displayed to correspond to a plurality of indoor units disposed on the other side (a room of the second group) within the building and a second outdoor unit display part 214b displayed to correspond to the outdoor unit 214b disposed outside the building.

Also, the drawing display part 200 may further include a second system connection line 260 that groups the plurality of first indoor unit display parts 213b and the first outdoor unit display part 214b together as one air conditioner system. Since the formation process of the second system connection line 260 is similar to that of the first system connection line 250, its description will be omitted. The second system connection line 260 may have a hexahedral shape.

When the second outdoor unit display part 214b and the plurality of indoor unit display parts 213b are completely designated to display the second system connection line 260, the product information display part 300 may display a second outdoor unit list 330 and a second indoor unit list 340.

The second outdoor unit list 330 may represent the outdoor unit corresponding to the designated second outdoor unit display part 214b, and the second indoor unit list 340 may represent the plurality of indoor units corresponding to the plurality of designated second indoor unit display parts 213b. The lists 330 and 340 include a type or model names of the outdoor and indoor units, respectively.

Figure 10:
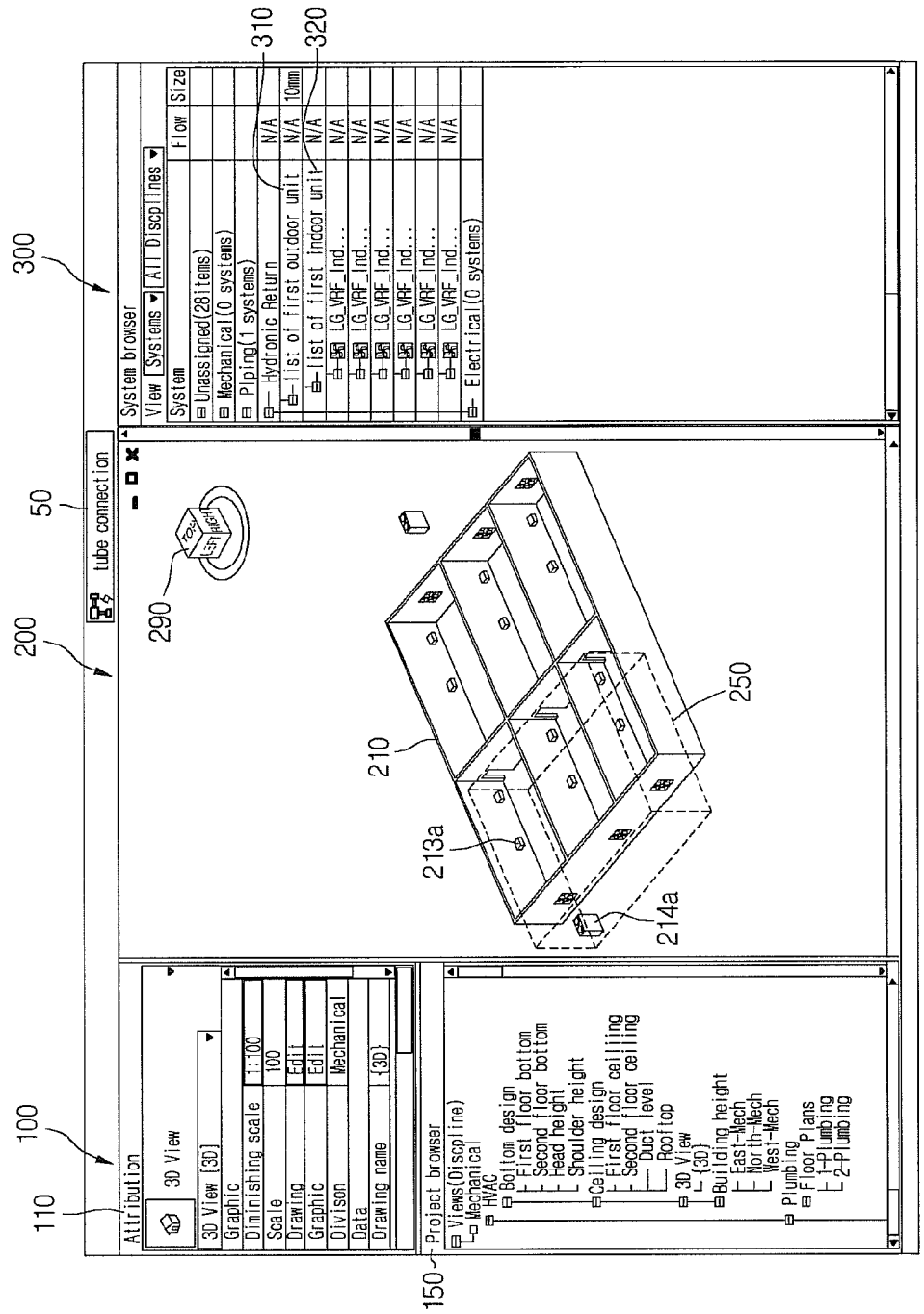
FIG. 10 is a view of the installation guide system in which a predetermined command is inputted to connect tubes of the first group of the outdoor and indoor units to each other.

FIG. 10 is a view of the installation guide system in which a predetermined command is inputted to connect tubes of the first group of the outdoor and indoor units to each other.

As shown in FIG. 8, in the state where the first group of indoor and outdoor units are connected to the system, when one point within an inner space or boundary defined by the first system connection line 250 is selected, a tube connection input part 50 may be displayed on the display 20. The tube connection input part 50 may be an icon, button, or the like.

When the tube connection input part 50 is selected, a disposition of a tube connecting the first group of outdoor and indoor units to each other may be recommended. For example, the tube may include a liquid tube, a gas tube, a drain tube, or the like.

Figure 11:
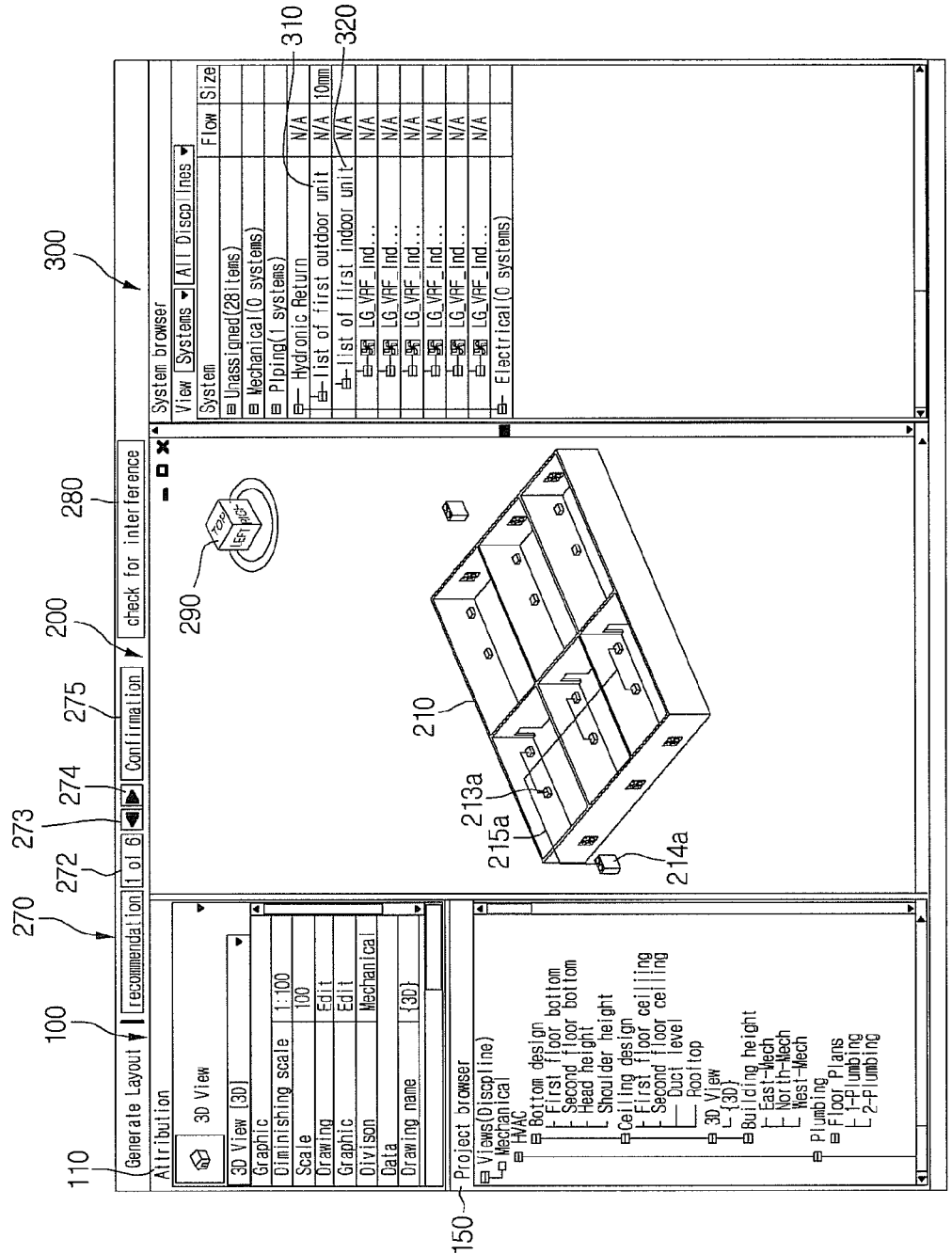
FIG. 11 is a view of the installation guide system in which the outdoor and indoor units are connected to each other through a first recommendation tube according to an embodiment.
Figure 12:
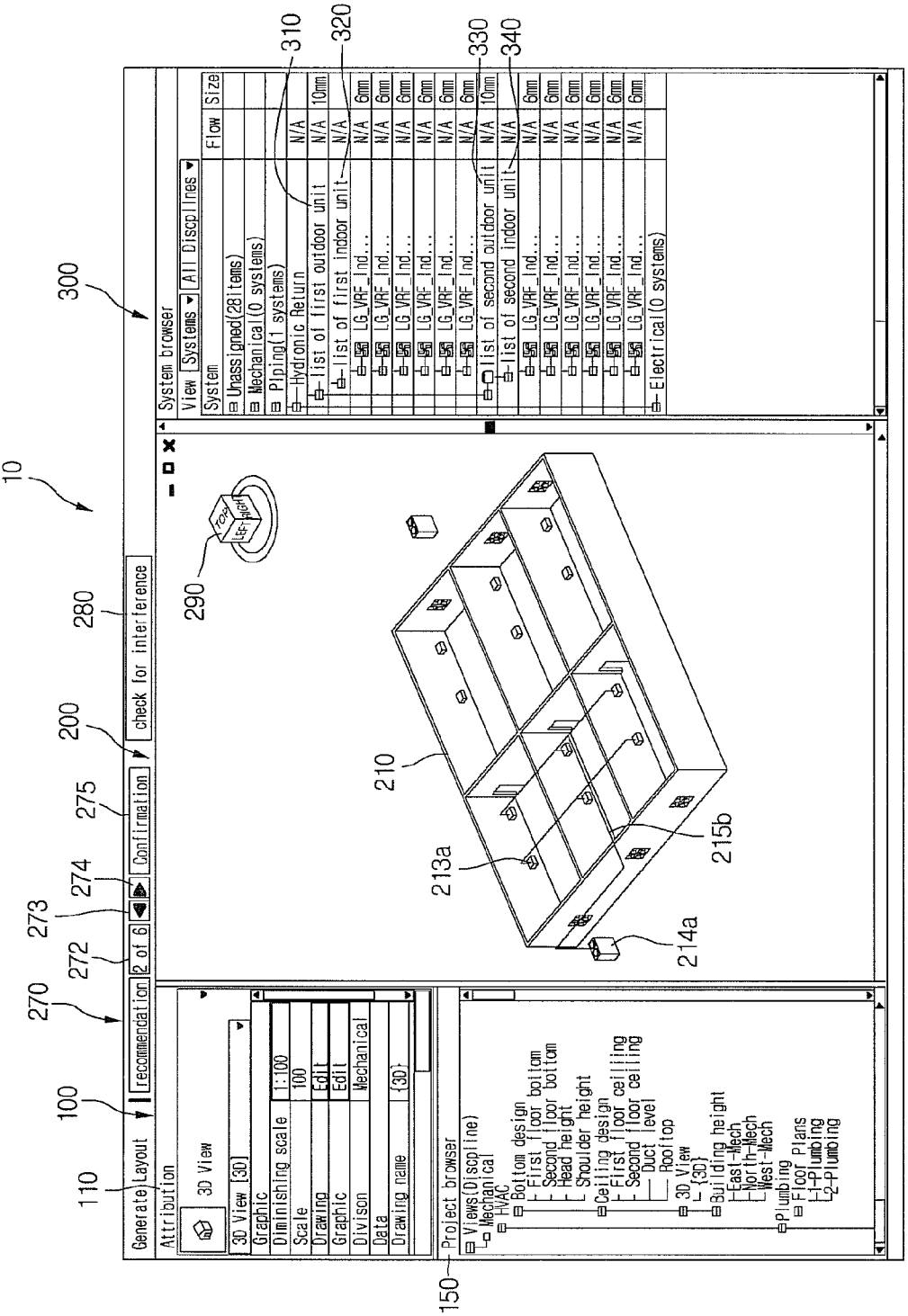
FIG. 12 is a view of the installation guide system in which the outdoor and indoor units are connected to each other through a second recommendation tube according to an embodiment.
Figure 13:
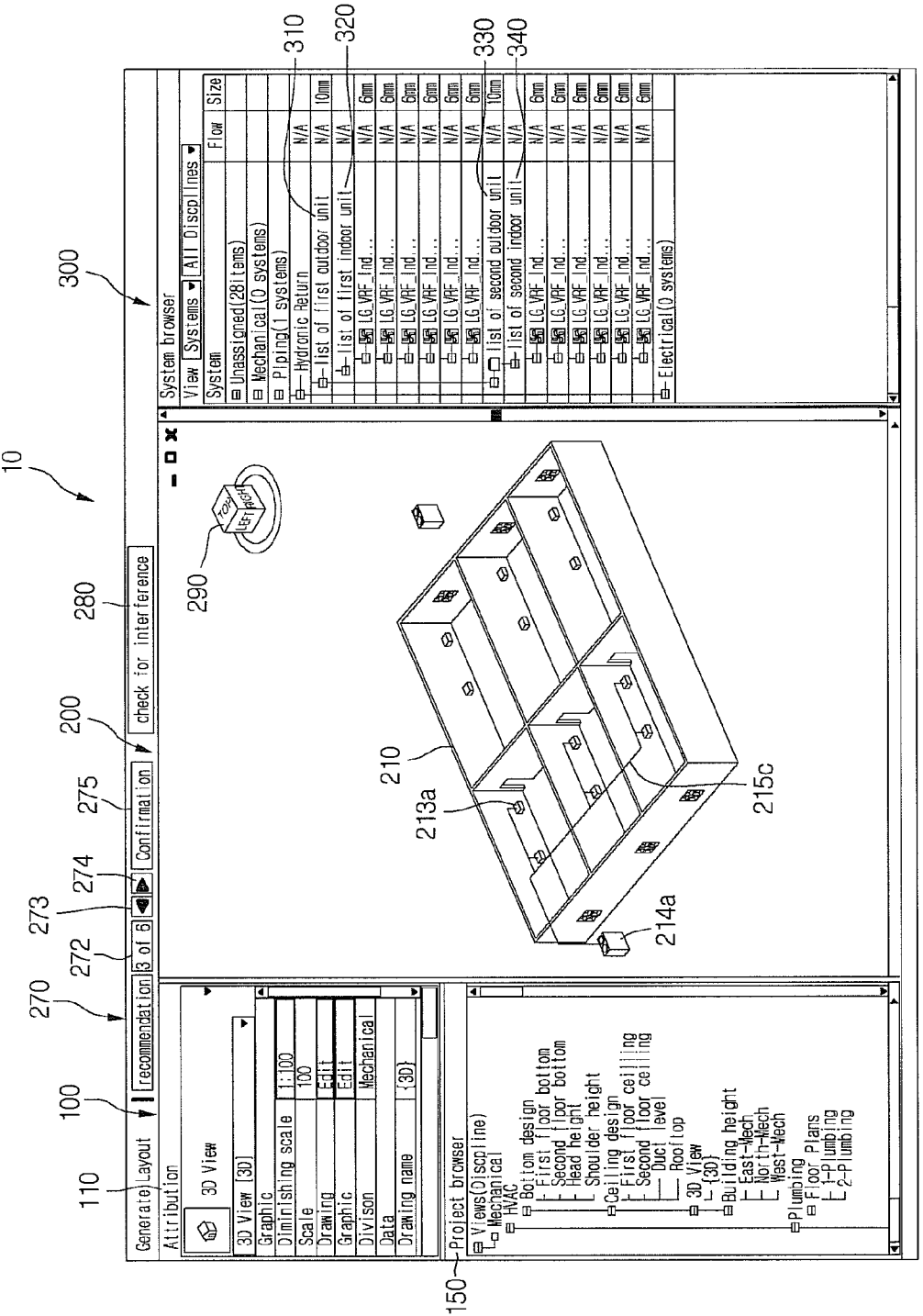
FIG. 13 is a view of the installation guide system in which the outdoor and indoor units are connected to each other through a third recommendation tube according to an embodiment.

FIG. 11 is a view of the installation guide system in which the outdoor and indoor units are connected to each other through a first recommended tube configuration according to an embodiment, FIG. 12 is a view of the installation guide system in which the outdoor and indoor units are connected to each other through a second recommended tube configuration according to an embodiment, and FIG. 13 is a view of the installation guide system in which the outdoor and indoor units are connected to each other through a third recommended tube configuration according to an embodiment.

When the tube connection input part 50 is inputted in FIG. 10, a recommendation display part 270 for displaying recommendation information of a specific tube connection method is displayed on the display 20. The recommendation display part 270 may include a recommendation order display part 272 for displaying one recommended method of connecting with respect to the plurality of connection methods and a pair of directional arrows 273 and 274 (also referred to herein as directional taps) that is selected for displaying the desired connection method according to the recommended order (or rank). The recommendation order display part 272 may display information with respect to the recommended order of the recommend configuration displayed on the drawing display part 200. The recommendation display part 270 may be a status bar, for example, that provides information regarding the available recommended configurations and enabling a selection of a configuration.

The pair of directional arrows 273 and 274 may include a first directional arrow 273 that may be selected for selecting a higher priority connection method and a second directional arrow 274 that may be selected for selecting a lower priority connection method on the basis of the recommended order. When the first and second directional arrows 273 and 274 are selected, the installed states of the connection tubes may be successively displayed (or changed) according to the set priority order.

For example, FIG. 11 illustrates a first connection method among six connection methods for connecting the first group of outdoor and plurality of indoor units to each other. Here, "1 of 6" may be displayed on the recommendation order display part 272. Also, the first outdoor unit display part 214a and a first recommendation tube 215a connecting the plurality of first indoor unit display parts 213a to each other may be displayed on the drawing display part 200.

If the second directional arrow 274 is selected once in the connection state of the tubes illustrated in FIG. 11, a second in order of the connection methods as shown in FIG. 12 may be displayed. Here, "2 of 6" may be displayed on the recommendation order display part 272.

Also, the drawing display part 200 may display the first outdoor unit display part 214a and a second recommendation tube 215b that connects the plurality of first indoor unit display parts 213a to each other. Of course, an extension shape of the second recommendation tube 215b may be different from that of the first recommendation tube 215a.

If the second directional arrow 274 is selected once in the connection state of the tubes illustrated in FIG. 12, a third ranked connection method as shown in FIG. 13 may be displayed. Here, "3 of 6" may be displayed on the recommendation order display part 272.

Also, the drawing display part 200 may display the first outdoor unit display part 214a and a third recommendation tube 215c that connects the plurality of first indoor unit display parts 213a to each other. Of course, an extension shape of the third recommendation tube 215c may be different from those of the first and second recommendation tubes 215a and 215b.

Thus, in the current embodiment, the six tube connection methods may be recommended through the above-described manner. Of course, the present disclosure is not limited to the number of recommended tube connection methods.

The user may select one tube connection method of the plurality of recommended tube connection methods. For example, when the confirmation arrow 275 is selected in a state where recommendation tube configuration is displayed on the drawing display part 200, the corresponding recommendation tube configuration may be applied as the connection tube configuration.

The six tube connection methods may be proposed as installable tube structures on the basis of the structure of the building, the capacity (performance) of the outdoor unit, the capacity (performance) of the indoor unit, or the load information of the room in which the indoor unit is installed. Here, the first in order of tube connection methods, e.g., the first recommendation tube 215a may be understood as the most adequate tube connection method in consideration of the costs and installation difficulty of the tubes.

Although the directional arrows 273 and 274 are disclosed as being selected to successively display the installed configurations of the recommendation tubes in the above-described embodiment, the present disclosure is not limited thereto. On the other hand, when the installed configuration according to the first priority order elapses for a set period of time, the installed configuration according to the second priority order may be automatically displayed on the drawing display part 200.

Moreover, although the installed configurations of the recommendation tubes may be manually or automatically and successively displayed in the above-described embodiment, the present disclosure is not limited thereto. On the other hand, the plurality of installed configurations (prior order and posterior order) with respect to the recommended tube configurations may be displayed on the drawing display part 200 at the same time.

Figure 14:
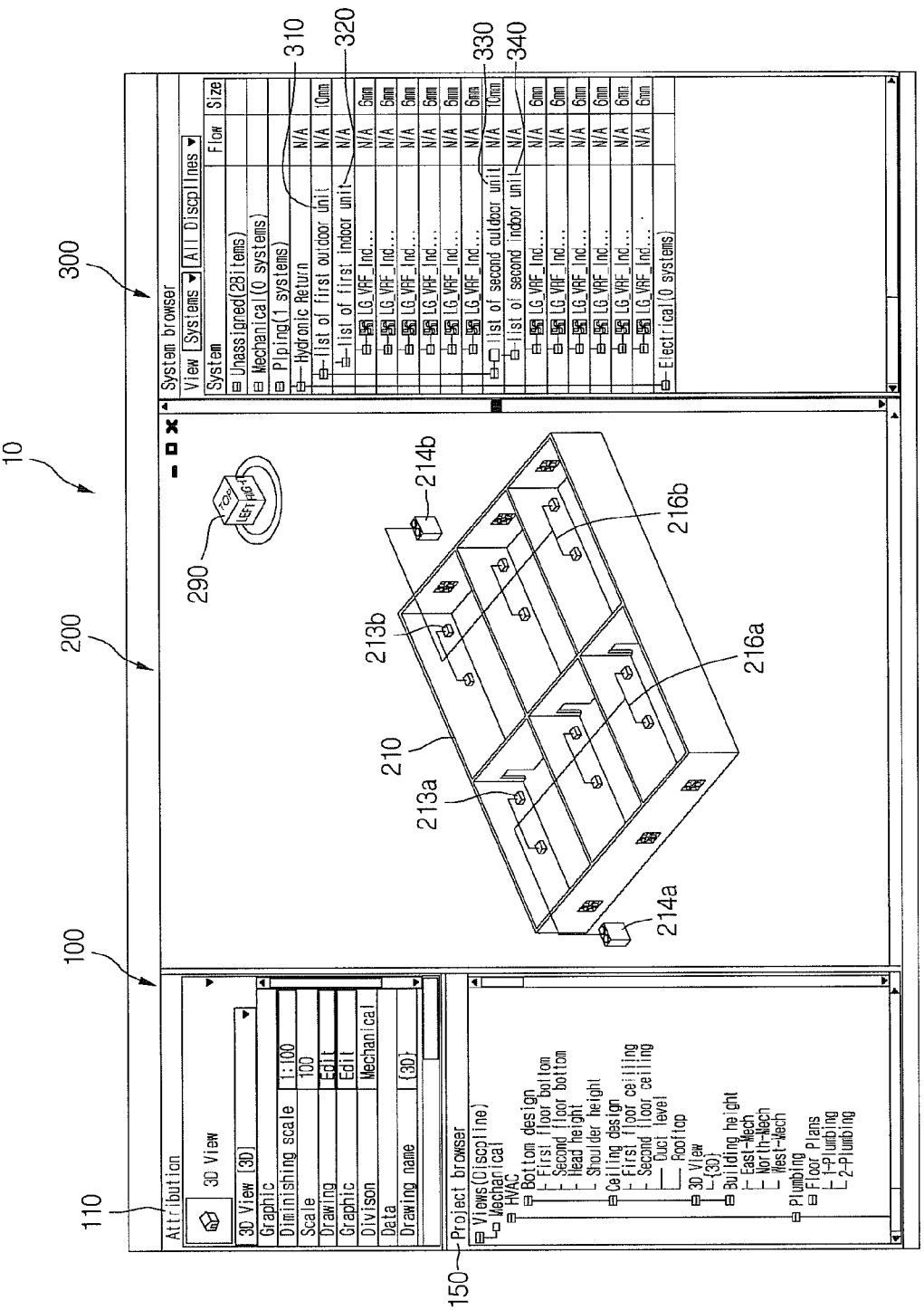
FIG. 14 is a perspective view of the installation guide system in which the outdoor and indoor units are connected to each other through a connection tube according to an embodiment.

FIG. 14 is a perspective view of the installation guide system in which the outdoor and indoor units are connected to each other through a connection tube according to an embodiment. A first connection tube 216a that connects the first group of outdoor and indoor units 214a and 213a to each other and a second connection tube 216b that connects the second group of outdoor and indoor units 213b and 214b to each other may be provided. For example, FIG. 14 illustrates a perspective view of a structure of the building and an installation configuration of the air conditioner having a plurality of groups.

The first connection tube 216a may be one connection method of the plurality of connection methods recommended with respect to the first group of outdoor and indoor units 214a and 213a, and the second connection tube 216b may be one connection method of the plurality of connection methods recommended with respect to the second group of outdoor and indoor units 214b and 213b. Thus, the plurality of indoor units disposed within the rooms of the building and the outdoor unit matching the plurality of indoor units may be connected to the each other through the connection tubes. As a result, it may be unnecessary to separately design the connection tubes for multiple groups by the user. Thus, since one connection method of the tube connection methods recommended in the system 10 may be selected, the tube installation may be easily performed.

Figure 15:
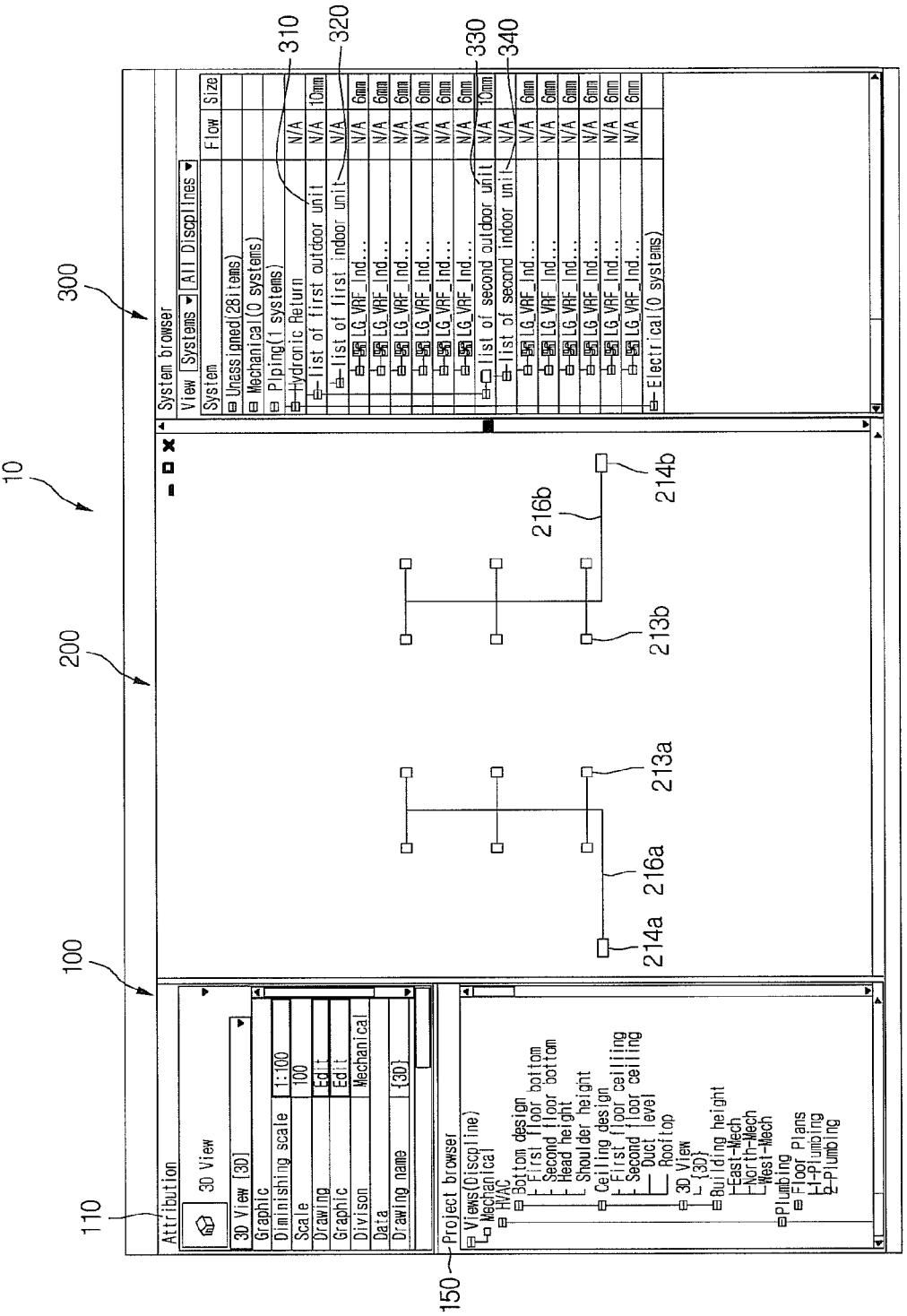
FIG. 15 is a plan view of the installation guide system in which the outdoor and indoor units are connected to each other through a connection tube according to an embodiment.
Figure 16:
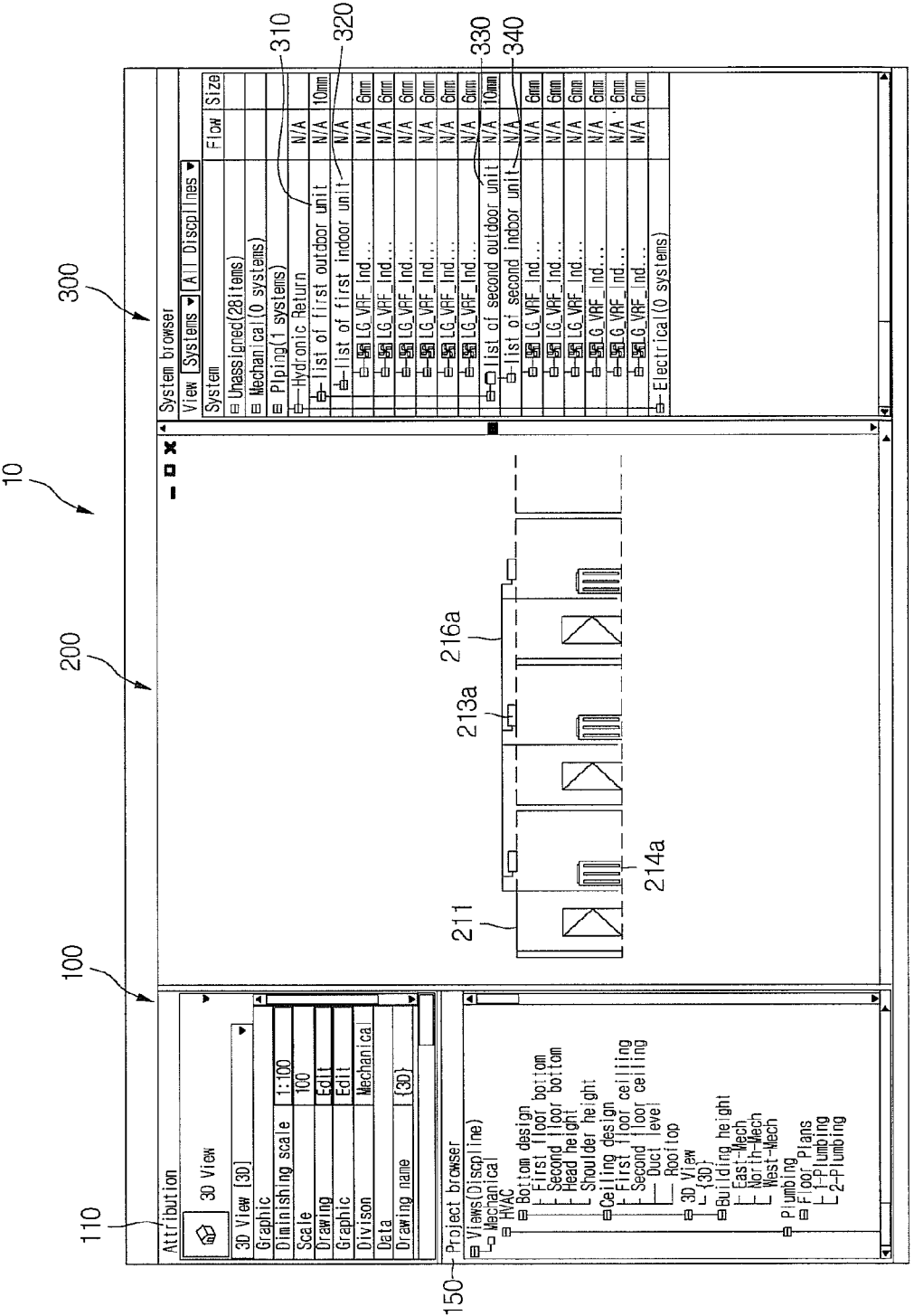
FIG. 16 is a front view of the installation guide system in which the outdoor and indoor units are connected to each other through a connection tube according to an embodiment.

FIG. 15 is a plan view of the installation guide system in which the outdoor and indoor units are connected to each other through a connection tube according to an embodiment, and FIG. 16 is a front view of the installation guide system in which the outdoor and indoor units are connected to each other through a connection tube according to an embodiment.

Referring to FIG. 15, the first group of outdoor and indoor units 214a and 213a, the first connection tube 216a connecting the first group of outdoor and indoor units 214a and 213a to each other, the second group of outdoor and indoor units 214b and 213b, and the second connection tube 216b connecting the second group of outdoor and indoor units 214b and 213b to each other may be displayed in a plan view.

Also, referring to FIG. 16, the first group of outdoor and indoor units 214a and 213a and the first connection tube 216a connecting the first group of outdoor and indoor units 214a and 213a to each other may be confirmed by viewing the front view. It should be sufficiently appreciated that the second group of outdoor and indoor units 214b and 213b and the second connection tube 216b connecting the second group of outdoor and indoor units 214b and 213b to each other may also be confirmed using the front view.

As described above, since the dispositions configurations of the specific group of outdoor and indoor units and the connection tube connecting the specific group of outdoor and indoor units to each other may be confirmed in various views, whether the air conditioner is adequately installed through the methods with respect to the structure of the building or the room may be more easily confirmed or verified.

For example, although the air conditioner may appear to be adequately installed in the perspective view, the air conditioner may not be adequately installed when viewed in the front or plan view. Particularly, in a case of the complex connection tube configurations, whether the interference between the tubes occurs may be confirmed through the specific drawings (one of the perspective, front, and plan views).

Figure 17:
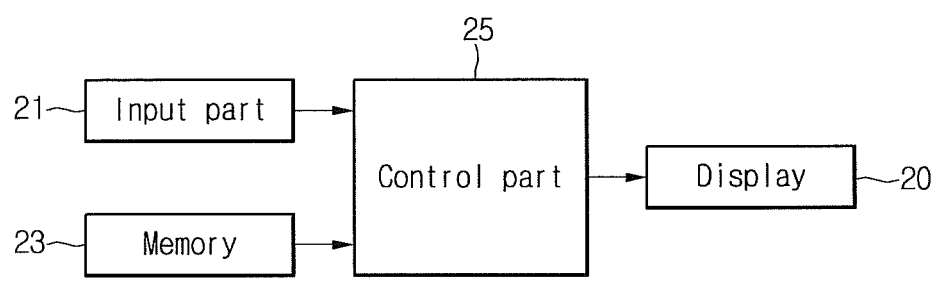
FIG. 17 is a block diagram of the installation guide system according to an embodiment.

FIG. 17 is a block diagram of the installation guide system according to an embodiment. An installation guide system 10 according to an embodiment may include an input part 21 ("Input Device") to input a predetermined command for disposition design of an air conditioner, a memory 23 to store information with respect to a space in which the air conditioner is installed, a display 20 displaying a process for the disposition design of the air conditioner, and a control part 25 to control the components.

The input part 21 may include a keyboard or mouse for a computer or another appropriate type of input device for a computing system based on the application. If a user's command can be inputted into the installation guide system 10, any input part may be allowable.

Drawing information including at least one of information of a building in which the air conditioner is installed, floor information, and room information may be stored in the memory 23. The drawing information may be received from a customer (e.g., landlord or building designer) and then stored in the system 10.

When the disposition of the air conditioner is designed, the drawing information may be displayed on the display 20, for example, a drawing display part 200. Also, a specific group of outdoor and indoor units and a connection tube connecting the outdoor and indoor units to each other together with the drawing information may be displayed on the drawing display part 200 according to the contents described above.

In the installation guide system of the air conditioner according to the embodiments, since the installation conditions of the building may be stored as an actual drawing with respect to the building, and then the air conditioner may be selected or installed adequate for the stored installation conditions, the air conditioner may be optimally installed, adequate for the installation conditions of the building.

Also, since the number of indoor units to be installed may be decided or recommended by calculating required cooling/heating capacity on the basis of the space information or use information (e.g., heat generation rate) of the building, the air conditioner may more easily and efficiently be installed.

Also, since the indoor units may be automatically disposed on the basis of the actual area and load information of the room in which the air conditioner is installed and the information with respect to the selected indoor unit, the indoor unit may more easily and efficiently be designed and installed.

Also, since the disposition of the tube connecting the indoor unit to the outdoor unit, for example, the dispositions of the liquid tube, the gas tube, and the drain tube may be recommended in the state where the indoor unit and the outdoor unit are disposed, and an adequate tube may be selected and connected according to the structure of the building, the installation convenience of the air conditioner may be improved.

Also, since the installation guide system of the air conditioner is provided as drawing program, the designer may easily manipulate the drawing. In detail, since the main menu, in which the installation information and product information may be obtained at a glance, may be provided on the display of the system, and the results obtained by selecting detailed menus of the main menu may be confirmed from the drawing, the accuracy in the design process may be improved.

Embodiments, as broadly described herein, provide an air conditioner installation guide system for guiding installation of an air conditioner and a method of using the same. In one embodiment, an installation guide system for an air conditioner includes: a memory storing drawing information of a building in which the air conditioner including an outdoor unit and an indoor unit is installed; and a display providing a user interface to design a disposition of the air conditioner, wherein the display includes: a recommendation display part displaying recommendation information with respect to installation of the tube connecting the outdoor unit to the indoor unit; and a drawing display part displaying the outdoor unit, the indoor unit, and the recommendation tube on the basis of the information displayed on the recommendation display part.

In another embodiment, a using method of an installation guide system for an air conditioner includes: displaying a drawing display part including drawing information of a building; disposing an indoor unit and an outdoor unit which constitute the air conditioner; grouping the indoor unit and the outdoor unit; recommending a connection tube connecting the indoor unit to the outdoor unit; and displaying the recommended connection tube on the drawing display part.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of using an installation guide system for an air conditioner, the method comprising:
    displaying a drawing of a building on a display;
    displaying a plurality of graphical objects representing an outdoor unit and a plurality of indoor units of an air conditioner, the graphical objects including an outdoor unit display part indicating the outdoor unit and a plurality of indoor unit display parts indicating the plurality of indoor units;
    grouping the outdoor unit and at least one of the plurality of indoor units, by using a connection line surrounding the outdoor unit display part and at least one of the plurality of indoor unit display parts;
    recommending a configuration of a connection tube that connects the outdoor unit and the at least one indoor unit;
    displaying information about a recommended order of preference of different routes of a plurality of connection tubes which connect the outdoor unit and the at least one indoor unit; and
    displaying a display of the outdoor unit, the at least one indoor unit and one of the different routes of the plurality of connection tubes in the display when the one of the different routes of the plurality of connection tubes is selected,
    wherein the display displays the outdoor unit, the at least one indoor unit, and the selected one of the different routes of the plurality of connection tubes in a perspective view, a plan view and a front view such that whether interference between the plurality of connection tubes occurs is confirmed through at least one of the perspective view, the plan view, or the front view, and
    wherein the grouping the outdoor unit and at least one of the plurality of indoor units includes:
        designating the outdoor unit display part by dragging a first region including the outdoor unit display part;
        designating the at least one of the plurality of indoor unit display parts by dragging a second region including the at least one of the plurality of indoor unit display part; and
        displaying the connection line to define a third region including the outdoor unit display part and the at least one of the plurality of indoor unit display parts therein, the connection line having a hexahedral shape.

2. The method according to claim 1, wherein the displaying the information about the recommended order of preference of the different routes of the plurality of connection tubes includes successively displaying the different routes of the plurality of connection tubes based on the recommended order of preference.

3. The method according to claim 1, wherein the recommended order of preference is based on at least one of a cost, a type, a diameter, or length of the different routes of the plurality of connection tubes.

4. The method according to claim 1, further comprising displaying at least one of a type or model of one of the outdoor unit or the at least one indoor unit.

* * * * *